July 11, 1939.  G. J. KESSENICH  2,165,274
SHOCK ABSORBING DEVICE
Filed May 10, 1938.
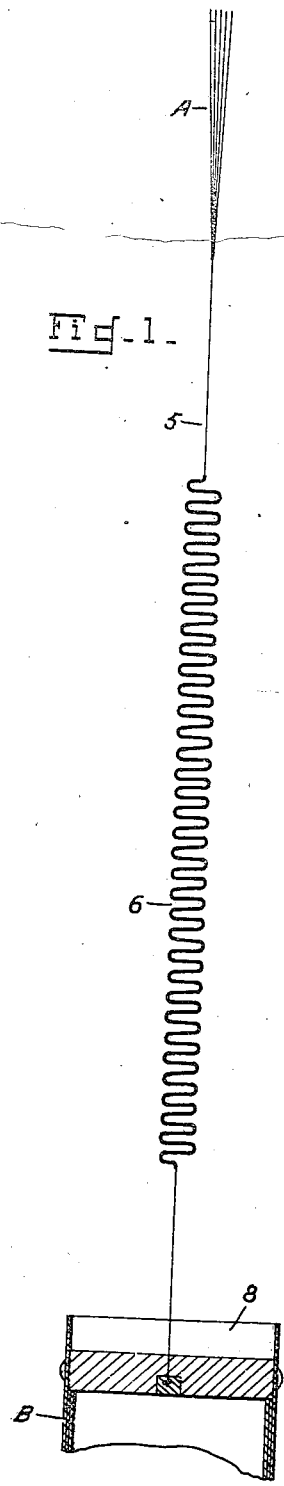
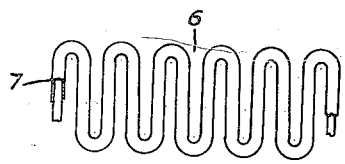
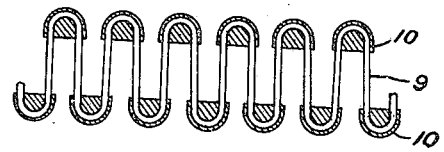
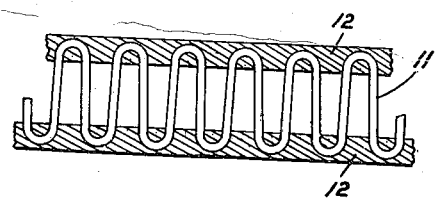
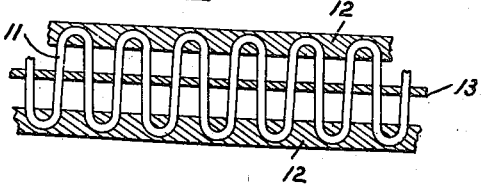
Inventor
Gregory J Kessenich Patented July 11, 1939

2,165,274

UNITED STATES PATENT OFFICE 2,165,274

SHOCK ABSORBING DEVICE

Gregory J. Kessenich, Madison, Wis.

Application May 10, 1938, Serial No. 207,108

3 Claims. (Cl. 244—138)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a shock absorbing device and more particularly it has reference to that class of shock absorbers which are particularly adapted to parachute suspensions though not limited thereto.

When a parachute and a body to be suspended thereby are traveling at high speed at the time the parachute is opened, the shock occasioned by the sudden retardation is frequently sufficient to cause the shrouds or the fabric of the parachute to give away or to cause injury to the suspended body.

The purpose of this invention is to associate a shock absorbing element with the suspension cable and to so form and arrange the element that it will resist straightening of the cable and thereby provide a gradual retardation of the suspended body when the parachute is opened.

A further object is to so form the shock absorbing element that it may be conveniently packed into a container without loss of space.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in side elevation of the shock absorbing device prior to opening of the parachute;

Fig. 2 is an enlarged view in side elevation with parts in section of a portion of the shock absorbing device;

Figs. 3, 4 and 5 are similar views showing modifications of the invention.

Referring to Figs. 1 and 2 there are shown the shrouds A of a parachute and a body B connected to the shrouds by a flexible suspension cable 5. A portion of the cable is formed into a plurality of folds 6 covered by a metalized coating 7 of bendable material, such as copper or solder which may be applied by spraying or dipping. The coating supplies sufficient rigidity to maintain the cable in folded form and will yieldingly resist straightening out of the cable when tension is applied thereto.

The cable including the folded portion is normally carried in a container 8 which may be associated with either the body or the shrouds or which may be independent of these members. The cable by virtue of its particular form lends itself readily to packing in the container as it may be wound in a plane spiral or sections thereof may be folded on one another.

In Fig. 3 each bent portion of the cable 9 is independently encased in yieldable metal 10.

In Fig. 4 the bent portions of the cable 11 are encased in continuous bands 12—12 of yieldable metal. Fig. 5 shows a similar arrangement with the addition of a central band 13.

When the parachute and the body to be suspended thereby are released in space their separation causes the suspension cable with its folded portion to be withdrawn from the container as shown in Fig. 1. The parachute on opening is retarded and the energy of the falling body is gradually absorbed when the cable in straightening out bends or breaks away from the yielding material encasing the folded portions.

I claim:

1. A shock absorbing device comprising a flexible cable having a portion formed into folds, and a coating of yielding material applied on the folded portion normally maintaining the folds in a common plane and yieldingly resisting straightening thereof when tension is applied to the cable, said cable adapted to remain straightened out.

2. A shock absorbing device comprising a flexible cable having a portion bent into folds, and a coating of yielding material encasing the bent portions of the folds, said material normally maintaining the folds in a common plane and yeildingly resisting straightening thereof when tension is applied to the cable, said cable adapted to remain straightened out.

3. A shock absorbing device comprising a flexible cable having a portion bent into folds, and bands of yielding material encasing the bent portions of the folds, said material normally maintaining the folds in a common plane and yieldingly resisting straightening thereof when tension is applied to the cable, said cable adapted to remain straightened out.

GREGORY J. KESSENICH.